J. R. GRAVES & J. BENSON.
DETACHABLE SEAT FOR AUTOMOBILES, &c.
APPLICATION FILED MAY 18, 1907.
937,595.
Patented Oct. 19, 1909.
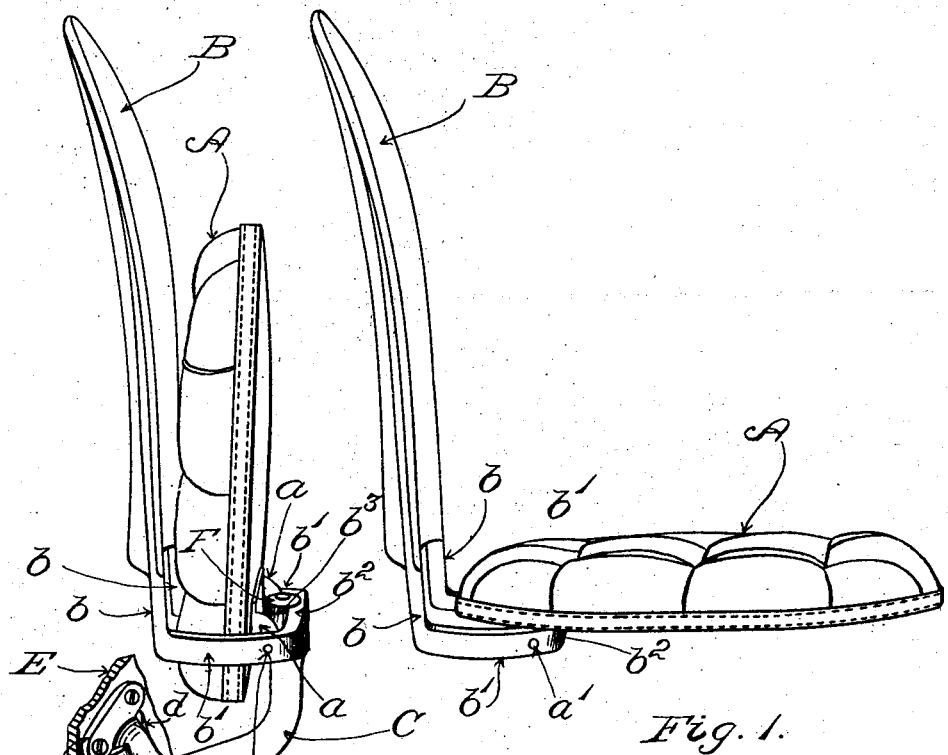
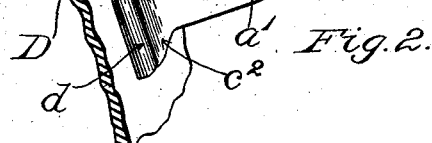
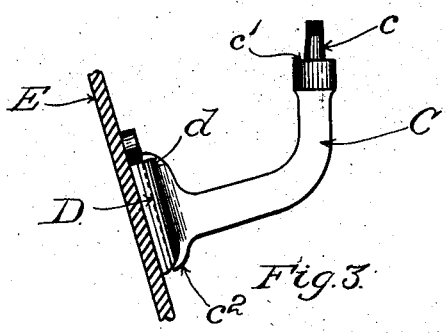
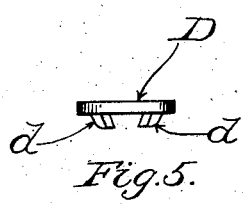
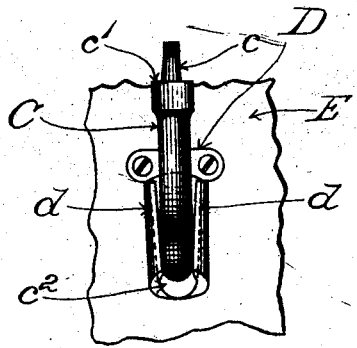
Witnesses:
Oscar F. Hill
Edith J. Anderson
Inventors:
James R. Graves
Judson Benson
by Chas. F. Randall
Attorney.

UNITED STATES PATENT OFFICE.

JAMES R. GRAVES AND JUDSON BENSON, OF AMESBURY, MASSACHUSETTS.

DETACHABLE SEAT FOR AUTOMOBILES, &c.

937,595.

Specification of Letters Patent.

Patented Oct. 19, 1909.

Application filed May 18, 1907. Serial No. 374,432.

*To all whom it may concern:*

Be it known that we, JAMES R. GRAVES and JUDSON BENSON, citizens of the United States, residing at Amesbury, in the county of Essex, State of Massachusetts, have invented a certain new and useful Improvement in Detachable Seats for Automobiles and other Vehicles, of which the following is a specification, reference being had therein to the accompanying drawings.

In some cases, automobiles and other vehicles are furnished with small additional seats intended to be utilized by extra passengers.

The invention has relation to seats of this class, and to the means of mounting and supporting the same.

The invention consists in an improved hinge-mounting for the seat, and in improved means for detachably mounting the seat in an automobile or other vehicle.

The invention is illustrated in the accompanying drawings, in which latter,—

Figure 1 shows in perspective a seat having certain features of our invention embodied in connection therewith. In this figure the seat proper is shown in position for use. Fig. 2 shows certain of the parts of Fig. 1, with the seat in an upturned position, and illustrates more particularly the manner of hinging the seat. Fig. 3 shows on an enlarged scale the supporting socket and the arm which is detachably applied thereto, with the seat removed. Fig. 4 shows the parts of Fig. 3 in front elevation. Fig. 5 is a top view of the supporting socket.

Having reference to the drawings,—at A is shown the seat proper, and at B is shown the back, which is constructed with an iron frame, the opposite side-portions $b, b$, of which extend down below the upholstered part of the back and are united with horizontally extending side-arms $b', b'$, which latter at their front ends are joined together by a cross-bar $b^2$. Heretofore in the like constructions the seat has been hinged upon the top of the cross-bar $b^2$ by means of lugs carried by the seat and projecting from the under side thereof, lugs rising from the top of the cross-bar, and connecting pivotal pins applied to the two sets of lugs. With this construction, when the seat is turned back into the position it occupies in Fig. 2, the upwardly extending lugs rising from the cross-bar, and also those which are provided upon the under side of the seat, project somewhat prominently, and they not only render the appearance of the seat more or less unsightly and therefore unsatisfactory, but garments and the like are in danger of catching thereon, and accidental contact with the same is liable to result in bodily injury to passengers. In conformity with the first portion of the present invention, we provide the seat A at its under side with lugs $a, a$, arranged to extend down alongside the respective side arms $b', b'$, and the pivotal pins $a'$ are passed through the said lugs and the said side-arms, thereby joining the lugs to the side-arms. Thus we dispense with lugs or other projections rising from the cross-bar, and the lugs $a, a$, applied to the under side of the seat are more or less completely hidden and shielded by the side-arms when the seat-proper occupies its up-turned position in Fig. 2.

At C is a supporting-arm for the seat A. This arm is provided at its outer or free end with an upwardly extending tapered pin $c$, and with a shoulder $c'$ at the base of such pin. Cross-bar $b^2$ of the seat-structure is formed with a hole or socket at $b^3$ to fit the said pin, and when the parts have been fitted together as in Fig. 1 the under side of the cross-bar rests on the shoulder $c'$ and the seat thereby is mounted on the arm.

At D is a stand which in use is attached to a suitable portion, as E, of the body of the automobile or other vehicle in which the seat is used. The supporting-arm C and the stand D are constructed to be detachably connected together by means of a socket with which one of such parts is formed, and a corresponding portion of the other of such parts adapted to enter the said socket. Herein, the socket is provided upon the stand D and formed by means of side-flanges $d, d$, which incline inwardly, the said flanges also converging toward each other at their lower ends to receive the engaging portion $c^2$ of the supporting-arm, the said engaging portion being formed with oppositely projecting side-flanges to fit in behind the said flanges $d, d$. The said engaging portion is tapered to correspond with the convergence of the flanges $d, d$. When it is pushed down between the said flanges the supporting-arm is sustained in place.

The pin $c$ of the supporting-arm is formed at its top end with a cylindrical screw-threaded extension which projects above the top of the cross-bar $b^2$ and receives a nut F, whereby the supporting-arm and cross-bar are secured together, but with capacity for relative turning or swiveling movement.

It has been proposed in some cases heretofore to employ a supporting-arm for application to the body of the automobile or other vehicle, and a seat detachably applied to the free extremity of the said supporting-arm. When not required to be used, the seat has been removed by lifting it from the supporting-arm. The supporting-arm, however, has remained in place, projecting into the way of passengers in the vehicle, with liability to constitute more or less of an obstruction, and to catch on garments, or occasion bodily injury to the passengers. By making the supporting-arm detachable with the seat we overcome these drawbacks.

The particular form of the socket and engaging portion is not of the gist of the invention, broadly considered, and in some embodiments of the invention may be varied.

While we have mentioned automobiles and other vehicles herein, it is to be understood that the invention is not necessarily restricted to use in connection therewith.

We claim as our invention:—

1. The combination with a supporting arm C having the pin $c$, of the back having the skeleton frame comprising the opposite side-portions $b, b$, extending down below the upholstered part of the back and provided with the horizontally extending side-arms $b', b'$, between which the rear portion of the seat descends when the seat is turned up, the cross-bar $b^2$ joining together the front ends of said side-arms, the seat provided beneath with lugs $a, a$, located at the opposite sides thereof and arranged to extend down alongside the respective side-arms, and the pivotal pins passing through the said lugs and the said side-arms, whereby the employment of lugs or other projections rising from the cross-bar is obviated and the said lugs of the seat are hidden and shielded by the side-arms.

2. In combination, the stand adapted for attachment to the body of an automobile or other vehicle, the supporting-arm C having the pin $c$, the said stand and supporting-arm having respectively a socket and an engaging portion which detachably fit together, the back having the skeleton frame comprising the opposite side-portions $b, b$, extending down below the upholstered part of the back and provided with the horizontally extending side-arms $b', b'$, between which the rear portion of the seat descends when the seat is turned up, the cross-bar $b^2$ joining together the front ends of said side-arms, the seat provided beneath with lugs $a, a$, located at its opposite sides and arranged to extend down alongside the respective side-arms, and the pivotal pins passing through the said lugs and the said side-arms, whereby the employment of lugs or other projections rising from the cross-bar is obviated and the said lugs of the seat are hidden and shielded by the side-arms.

In testimony whereof we affix our signatures, in presence of two witnesses.

JAMES R. GRAVES.
JUDSON BENSON.

Witnesses:
NELLIE M. ATTRIDGE,
CHARLES H. STANLEY.